United States Patent
Khare et al.

(10) Patent No.: US 11,605,006 B2
(45) Date of Patent: Mar. 14, 2023

(54) DEEP-LEARNING MODEL CATALOG CREATION

(71) Applicant: International Business Machines Corporation, Armonk, NY (US)

(72) Inventors: Shreya Khare, Bangalore (IN); Srikanth Govindaraj Tamilselvam, Chennai (IN); Anush Sankaran, Bangalore (IN); Naveen Panwar, Bangalore (IN); Rahul Rajendra Aralikatte, Bangalore (IN); Senthil Kumar Kumarasamy Mani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 982 days.

(21) Appl. No.: 16/404,141

(22) Filed: May 6, 2019

(65) Prior Publication Data

US 2020/0356868 A1 Nov. 12, 2020

(51) Int. Cl.
*G06N 20/00* (2019.01)
*G06N 5/02* (2006.01)
(Continued)

(52) U.S. Cl.
CPC ............. *G06N 5/022* (2013.01); *G06F 8/427* (2013.01); *G06F 40/205* (2020.01); *G06N 5/027* (2013.01); *G06N 20/00* (2019.01)

(58) Field of Classification Search
CPC ........ G06N 5/022; G06N 20/00; G06N 5/027; G06F 40/205; G06F 8/427
See application file for complete search history.

(56) References Cited

U.S. PATENT DOCUMENTS

2017/0109418 A1 4/2017 Bartlett et al.
2017/0169103 A1 6/2017 Juneja et al.
(Continued)

OTHER PUBLICATIONS

Lippmann, Richard, William Campbell, and Joseph Campbell. "An overview of the DARPA data driven discovery of models (D3M) program." In NIPS Workshop on Artificial Intelligence for Data Science, pp. 1-2. 2016. (Year: 2016).*
(Continued)

*Primary Examiner* — Casey R. Garner
(74) *Attorney, Agent, or Firm* — Ference & Associates LLC

(57) ABSTRACT

One embodiment provides a method, including: mining a plurality of deep-learning models from a plurality of input sources; extracting information from each of the deep-learning models, by parsing at least one of (i) code corresponding to the deep-learning model and (ii) text corresponding to the deep-learning model; identifying, for each of the deep-learning models, operators that perform operations within the deep-learning model; producing, for each of the deep-learning models and from (i) the extracted information and (ii) the identified operators, an ontology comprising terms and features of the deep-learning model, wherein the producing comprises populating a pre-defined ontology format with features of each deep-learning model; and generating a deep-learning model catalog comprising the plurality of deep-learning models, wherein the catalog comprises, for each of the deep-learning models, the ontology corresponding to the deep-learning model.

20 Claims, 3 Drawing Sheets

(51) Int. Cl.
    *G06F 8/41*           (2018.01)
    *G06F 40/205*      (2020.01)
    *G06N 5/022*       (2023.01)

(56) References Cited

U.S. PATENT DOCUMENTS

| | | |
|---|---|---|
| 2017/0178020 A1 | 6/2017 | Duggan et al. |
| 2017/0330105 A1 | 11/2017 | Lindsley |
| 2018/0307978 A1* | 10/2018 | Ar .......................... G06N 3/105 |

OTHER PUBLICATIONS

Gil, Yolanda, Kelly Cobourn, Ewa Deelman, Chris Duffy, Rafael Ferreira da Silva, Armen Kemanian, Craig Knoblock et al. "Mint: Model integration through knowledge-powered data and process composition." (2018). (Year: 2018).*

Gil, Yolanda, Ke-Thia Yao, Varun Ratnakar, Daniel Garijo, Greg Ver Steeg, Pedro Szekely, Rob Brekelmans, Mayank Kejriwal, Fanghao Luo, and I-Hui Huang. "P4ML: A phased performance-based pipeline planner for automated machine learning." In AutoML Workshop at ICML. 2018. (Year: 2018).*

Zhao, Shuai, Manoop Talasila, Guy Jacobson, Cristian Borcea, Syed Anwar Aftab, and John F. Murray. "Packaging and sharing machine learning models via the acumos ai open platform." In 2018 17th IEEE International Conference on Machine Learning and Applications (ICMLA), pp. 841-846. IEEE, 2018. (Year: 2018).*

\* cited by examiner

DEEP-LEARNING MODEL CATALOG CREATION

BACKGROUND

Deep learning models are a type of machine learning model whose training is based upon learning data representations as opposed to task-specific learning. In other words, deep or machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible.

BRIEF SUMMARY

In summary, one aspect of the invention provides a method, comprising: mining a plurality of deep-learning models from a plurality of input sources; extracting information from each of the deep-learning models, by parsing at least one of (i) code corresponding to the deep-learning model and (ii) text corresponding to the deep-learning model; identifying, for each of the deep-learning models, operators that perform operations within the deep-learning model; producing, for each of the deep-learning models and from (i) the extracted information and (ii) the identified operators, an ontology comprising terms and features of the deep-learning model, wherein the producing comprises populating a pre-defined ontology format with features of each deep-learning model; and generating a deep-learning model catalog comprising the plurality of deep-learning models, wherein the catalog comprises, for each of the deep-learning models, the ontology corresponding to the deep-learning model.

Another aspect of the invention provides an apparatus, comprising: at least one processor; and a computer readable storage medium having computer readable program code embodied therewith and executable by the at least one processor, the computer readable program code comprising: computer readable program code configured to mine a plurality of deep-learning models from a plurality of input sources; computer readable program code configured to extract information from each of the deep-learning models, by parsing at least one of (i) code corresponding to the deep-learning model and (ii) text corresponding to the deep-learning model; computer readable program code configured to identify, for each of the deep-learning models, operators that perform operations within the deep-learning model; computer readable program code configured to produce, for each of the deep-learning models and from (i) the extracted information and (ii) the identified operators, an ontology comprising terms and features of the deep-learning model, wherein the producing comprises populating a pre-defined ontology format with features of each deep-learning model; and computer readable program code configured to generate a deep-learning model catalog comprising the plurality of deep-learning models, wherein the catalog comprises, for each of the deep-learning models, the ontology corresponding to the deep-learning model.

An additional aspect of the invention provides a computer program product, comprising: a computer readable storage medium having computer readable program code embodied therewith, the computer readable program code executable by a processor and comprising: computer readable program code configured to mine a plurality of deep-learning models from a plurality of input sources; computer readable program code configured to extract information from each of the deep-learning models, by parsing at least one of (i) code corresponding to the deep-learning model and (ii) text corresponding to the deep-learning model; computer readable program code configured to identify, for each of the deep-learning models, operators that perform operations within the deep-learning model; computer readable program code configured to produce, for each of the deep-learning models and from (i) the extracted information and (ii) the identified operators, an ontology comprising terms and features of the deep-learning model, wherein the producing comprises populating a pre-defined ontology format with features of each deep-learning model; and computer readable program code configured to generate a deep-learning model catalog comprising the plurality of deep-learning models, wherein the catalog comprises, for each of the deep-learning models, the ontology corresponding to the deep-learning model.

A further aspect of the invention provides a method, comprising: generating a deep-learning model catalog, wherein the deep-learning model catalog comprises (i) a plurality of deep-learning models and (ii) an ontology, in a pre-defined format, for each of the plurality of deep-learning models, wherein the generating comprises: obtaining, from at least one input source, a plurality of deep-learning models; and creating an ontology for each of the plurality of deep-learning models, wherein the ontology identifies attributes and terms for the deep-learning model, wherein the creating comprises: parsing, using a deep-learning model annotator, each of the deep-learning models to extract semantic information for each of the deep-learning models; identifying, for each of the deep-learning models, layers of the deep learning model, wherein the identifying comprises (i) identifying granular operations and (ii) grouping the granular operators into a layer that performs a task of the deep-learning model; and populating, for each of the deep-learning models, a pre-defined ontology format with (i) the extracted semantic information and (ii) the layers.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
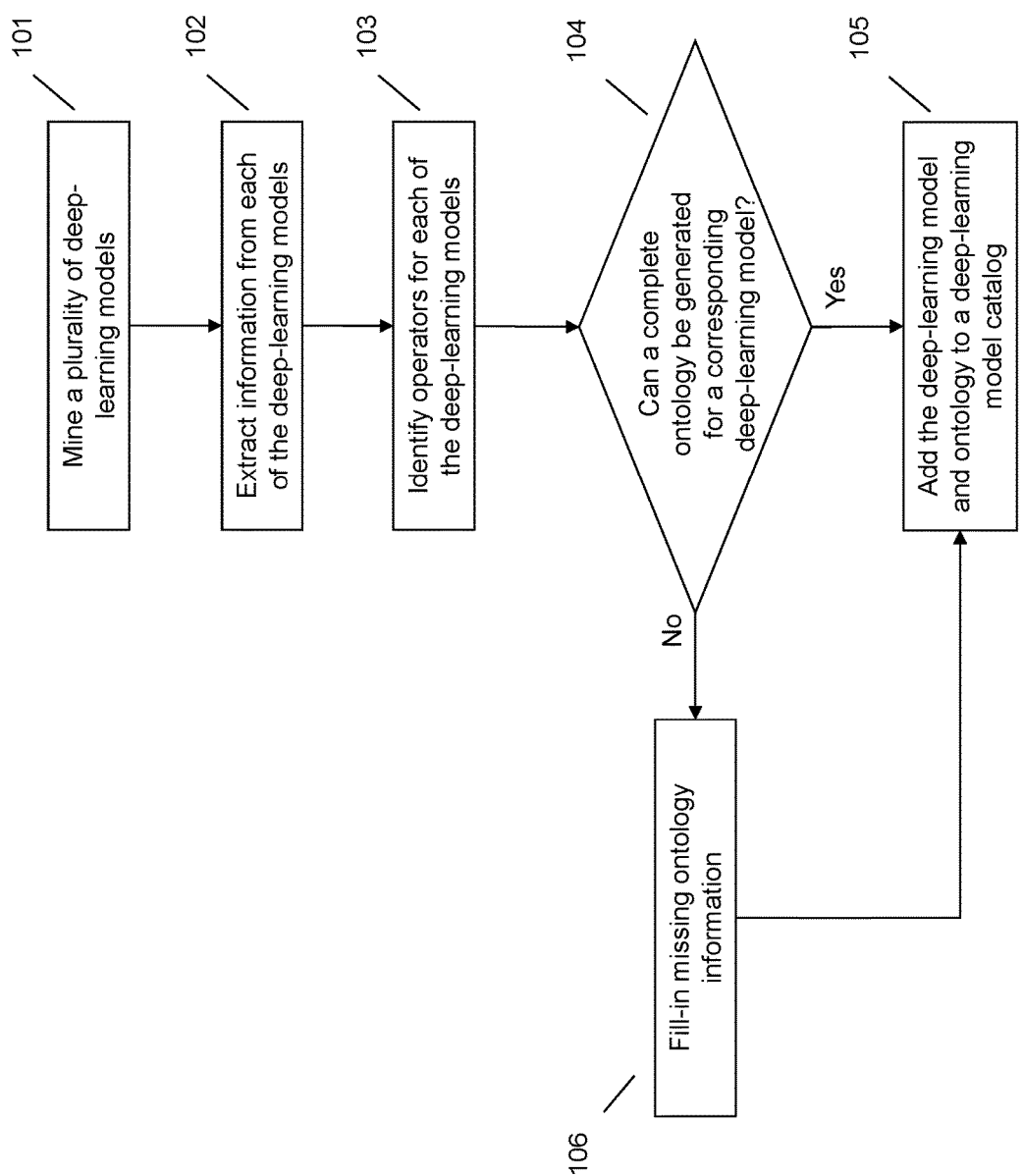
FIG. 1 illustrates a method of generating a deep-learning model catalog from deep-learning models mined from input sources through production of a deep-learning model ontology from the deep-learning model.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Deep-learning models are generally manually created by one or more developers. Thus, generation of a deep-learning model is very time consuming and requires significant expertise in not only coding the deep-learning model, but also the domain that the deep-learning model is being developed for. Many models are very complex and may be based upon a combination of different models and/or layers/function modules that each performs a particular function. For example, a larger deep-learning model may be created from a layer/function module that performs an embedding function, a layer/function module that performs a decoding function, and a layer/function module that performs a pooling function. These layers/function modules may then be integrated into a larger deep-learning model that performs a more complex function. However, unless the developer already has the smaller layers/functions modules, the developer has to manually create all of these layers/functions modules and then integrate them together in the larger deep-learning model. The development of deep-learning models would be quicker if the developer could access models and/or layers/function modules that have already been created by other developers.

While there are some repositories where developers can store deep-learning models and that allow access to stored models by other developers, there is no standardization of what information is extracted from a deep-learning model, and, therefore, no standardization of what information is provided with respect to a deep-learning model. Thus, with these repositories, it is very difficult for a developer who is looking for a particular deep-learning model to identify if such a model exists. Not only can the developer not identify if a model fitting all of the requirements exists, the developer also cannot determine if there may be a model that fits a subset of the requirements and, thus, might be a good model for the developer to start with. Additionally, if the developer is able to identify one or more models that may fulfill the requirements, the developer has no way of comparing the models to determine if one model might be a better fit than another model.

Accordingly, an embodiment provides a system and method for generating a deep-learning model catalog from deep-learning models mined from input sources through production of a deep-learning model ontology from each of the deep-learning models. The catalog can then be accessed by deep-learning model developers to identify a deep-learning model that can fulfill the requirements of the developer, that can be used as a starting point for the developer, or that can be used as a component of a larger deep-learning model. Additionally, the catalog provides a developer with the opportunity to compare models to identify a model that may best suit the needs of the developer.

The system mines a plurality of deep-learning models from different input sources. These input sources may include Internet-based sources that store models (e.g., repositories for deep-learning models, software development platforms, etc.), sources that discuss models (e.g., blogs, PDFs, papers, etc.), databases, or the like. For each of these models the system creates a model ontology. In order to maintain consistent information for each of the models, the system uses a pre-defined format for the ontology and then identifies and fills in the information identified and included in the pre-defined format. To fill in the information the system extracts information from each of the models by parsing either or both of the code corresponding to the model and text corresponding to the model (e.g., readme files, descriptions of the model, text provided with the model, etc.). The system also identifies the operators of the deep-learning model that are used to perform operations within the deep-learning model. These operators may include granular operators, therefore, the system may group the granular operators into groups that correspond to larger functions and identify the sub-tasks or layers of the deep-learning model. Once the ontology is populated for a deep-leaning model, the model and the corresponding ontology are added to a deep-learning model catalog that can be accessed by model developers. Within the catalog, the deep-learning models are indexed to allow for easy searching by a developer.

Such a system provides a technical improvement over current systems for storing deep-learning models. While some repositories for deep-learning models do exist, the information that is provided at the repository with regards to the deep-learning models is inconsistent across the models. Therefore, if a developer is accessing the repository it is generally very difficult to determine if one or more models that fulfill some or all of the requirements of the developer exist. Additionally, even if the developer is able to find one or more models that may work, the developer is unable to compare models to determine if one might be better suited than another. Since the described system and method populates a pre-defined ontology for each of the mined deep-learning models, the information that is stored and available for each model is consistent, thereby allowing a developer to determine if one or more models might fulfill requirements of the developer. Additionally, since the information that is identified is consistent across all of the models within the catalog, the developer can compare models to determine if one model may be better suited than another model. Thus, the described system provides a system that stores and indexes deep-learning models and provides comprehensive insight about these models. Accordingly, the development time for deep-learning models can be greatly reduced because a developer is able to find previously created models that do not have to be created by the developer, allowing the developer more time to focus on developing the components of the model that have not previously been created. Additionally, a person who is not as versed in coding models is able to find models that may serve a desired purpose without the person having to learn the programming required to generate the model.

FIG. 1 illustrates a method for generating a deep-learning model catalog from deep-learning models mined from input sources through production of a deep-learning model ontology from each of the deep-learning models. At 101 the system mines a plurality of deep-learning models from a plurality of input sources. The input sources may include Internet-based sources that store models (e.g., repositories for deep-learning models, software development platforms, etc.), sources that discuss models (e.g., blogs, PDFs, papers, etc.), databases, or the like. The system may access a single input source for deep-learning models and mine a plurality of models, may access multiple input sources and only mine a single model from each of those sources, or any combination thereof. In other words, the system does not have to mine multiple models from each of the input sources and/or does not have to access multiple input sources.

The system may access an input source and mine any deep-learning models from that source. Additionally, the system may mine any additional information that may be included with the model. For example, if the input source includes a description of the deep-learning model, the system may also mine and capture that information. As another example, if the input source includes code corresponding to the deep-learning model, the system may also mine and capture that information. The code may include pseudocode, portions of code used to program the model, or the entirety of the code that was used to program the model. Accordingly, the system attempts to mine and capture as much information regarding the model as possible from the input source. The system may also access other input sources to capture information related to the model. For example, if the input source is a blog that discusses the deep-learning model and also includes a link to the model itself, the system may access and mine the information from both the blog and the model itself as accessed through the link.

Once the system has mined the models and any corresponding information, the system extracts information from each of the models at 102. The system is attempting to fill-in information for an ontology for each of the deep-learning models. The ontology has a pre-defined format that identifies what information needs to be identified and included for the deep-learning models. This provides for consistent information across all of the mined models. Therefore, the information that is extracted may correspond to the information that is identified in the pre-defined ontology format. Extracting information may include parsing information from either or both of the code corresponding to the deep-learning model (e.g., pseudocode, code portions, entirety of model code, etc.) and any text corresponding to the deep-learning model (e.g., descriptions of the model, readme files, text provided with the model, etc.). In other words, the system is able to parse any of the information that was mined at 101. The extracted information assists in semantically understanding the model in order to fill-in the ontology.

In parsing the text, the system may utilize text parsers or text annotators that are specific to the deep-learning model domain. Traditional text annotators, for example, those based upon noun phrases, word phrases, parts-of-speech taggers, and the like, are ineffective for annotating the deep-learning model text. This is because the information that needs to be extracted is unique to the deep-learning model domain. Accordingly, the described system uses text annotators that are built specifically for the deep-learning model domain. These deep-learning model domain specific text annotators are able to extract deep-learning model parameters (e.g., accuracy, layers, preprocessing, operators, architecture, etc.) rather than traditional natural language processing parameters. Thus, these annotators are built based upon deep-learning model vocabulary and deep-learning model parsing rules.

Additionally, in extracting information from non-code portions (e.g. text-based portions) of the mined information, the system may extract information from images, tables, or the like, included in the non-code portion. The system is able to use rule-based classifiers and/or image extraction techniques to capture the images/tables included in the text sources. In performing image and/or table extraction, the system correlates the image/table to code by utilizing an image/table to code ontology. Thus, the system is able to create pseudocode or complete code that corresponds to the image/table. With respect to the true text portion of the non-code portion, the system can utilize text analysis techniques, for example, information extraction techniques, text parsers unique to the deep-learning model domain, text annotators unique to the deep-learning model domain, natural language processing techniques, and the like. The text analysis techniques may include first performing a step of classifying the language and preprocessing the text. The system may then perform a lexical analysis to identify words and phrases included in the text. The system may then utilize a parser that is programmed with deep-learning model parsing rules to parse the text. A last step of deep-learning model facet or feature extraction may be performed, thereby allowing for extraction of information from the text portion of the non-code based source. The information extracted from both the image/table portion and the text-based portion of the non-code portion can then be used in the ontology.

In parsing a code portion of mined information, the system may also utilize the deep-learning model annotators and/or parsers. Parsing the code may first include identifying the deep learning code framework of the code. The code framework identifies what code language the deep-learning model code is programmed within. Since different programming codes use different frameworks, the system first identifies the framework so that code parsing unique to the framework can be utilized, which allows for more accurate extraction of information from the code. The system then employs a code parser that is unique to the identified framework. For example, the system may employ a semantic code parser that is specific to or unique to the identified code framework to identify concepts or parameters (e.g., architecture, layers, etc.) contained within the code. Utilizing a knowledge base that includes a code ontology that is defined by the system and includes a mapping of framework-based components to semantic-based components, the system can tag the different concepts within the code using deep-learning model identifiers. This tagging provides a mapping between particular lines or portions of code and a semantic concept. For example, the tagging may identify that a particular sub-task or function of the deep-learning model (e.g., encoder, decoder, embedder, pooler, etc.) is programmed within specific lines or portions of the code.

At 103 the system identifies operators for each of the deep-learning models. The operators act to perform operations within the deep-learning model. The operators may be extracted from either or both of the non-code and code portions of the mined information. In the case of parsing code to identify operators, the system may first take the code and parse it to generate an abstract syntax tree (AST) using an abstract syntax tree builder. An AST is a tree representation of the abstract syntactic structure of the code. Each node of the tree represents a construct occurring in the code. Thus, using an AST builder, the system can traverse the code and generate an AST representing the code.

From the AST the system can perform a data flow analysis and control flow analysis that identifies the data flow and control flow, respectively, of the code. From a combination of the output of these analyses the system can perform a semantic code analysis and a platform, or code, specific application programming interface (API) call analysis. API calls are those functions that are used to communicate between different portions of code. In other words, API calls are links to different portions of code so that some function associated with the other portion of code can be performed. The semantic code analysis and API call analysis results in an identification of different operations contained within the code. For example, the analysis identifies layer parameters, metrics used within the deep-learning code, and the transformations and preprocessing steps that are performed. This type of analysis can also be performed on custom code. Therefore, the described system and method supports ontology creation for all code, even if the code was custom-created by a developer.

The operators that are extracted are generally granular operators. In other words, the extracted operators are those that perform a very small, specific operation. While these operators provide useful information for filling in the ontology, these operators are generally used within a set or series that performs a larger sub-task or function of the deep-learning model. Accordingly, the system identifies the larger sub-task by grouping a series or sequence of granular operations into a group corresponding to a sub-task or function of the deep-learning model. Once the granular operations are grouped, the system can map the group or sequence of operators to the larger sub-task, function, or layer. For example, a group of operators may correspond to an encoder sub-task or function. As another example, a group of operators may correspond to a decoder layer of the deep-learning model. This sub-task, function, or layer can then be listed in the ontology.

Figure 2:
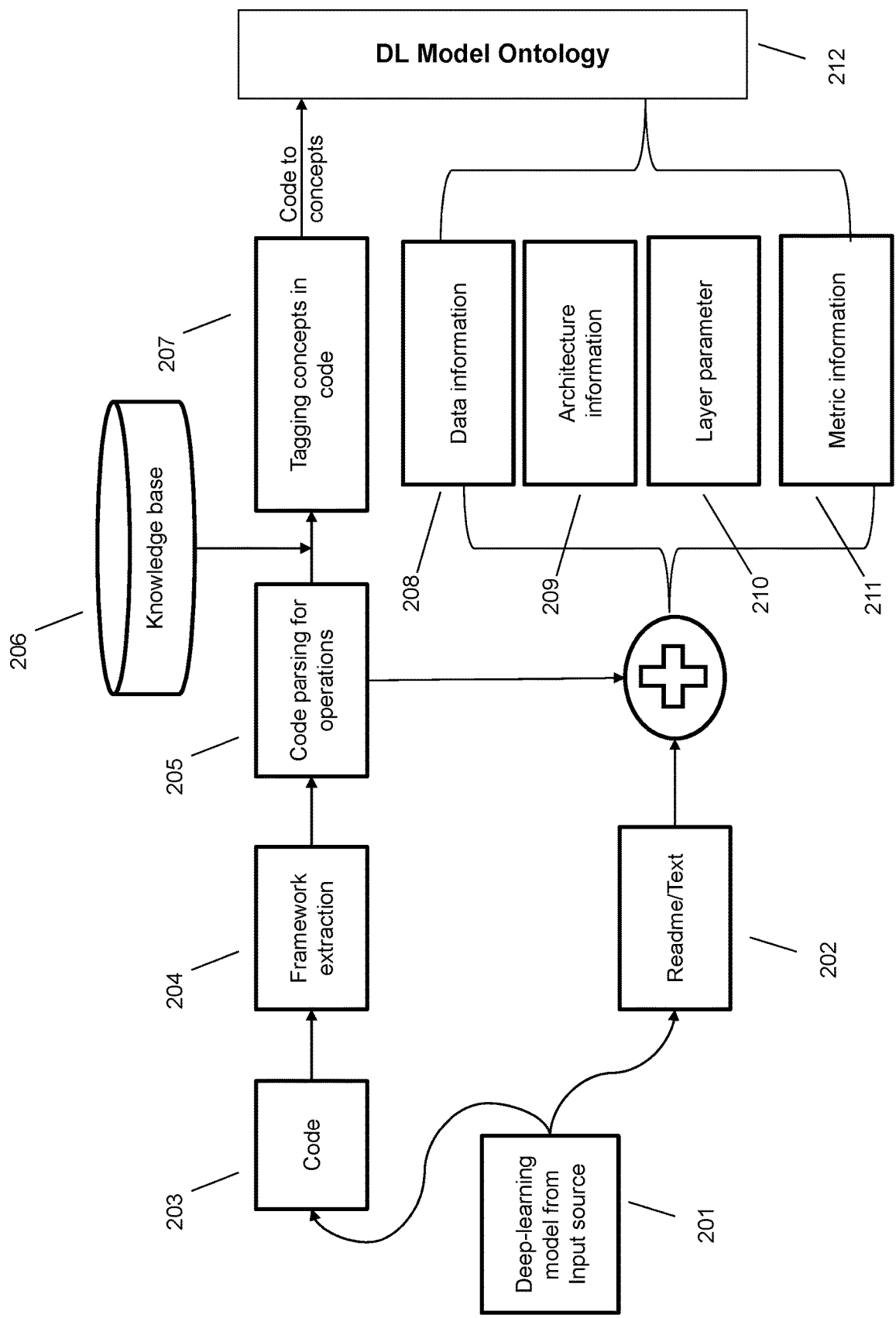
FIG. 2 illustrates an example system architecture for generating a deep-learning model ontology from a deep-learning model mined from an input source.

FIG. 2 illustrates an overall example for extraction of information and identification of operations for the deep-learning model. The deep-learning model and other mined information is obtained at 201. The system can parse the readme files and/or other text corresponding to the model at 202 to extract information for the ontology. From the code 203 corresponding to the deep-learning model, the system can perform a framework extraction 204 to identify the code framework of the code. The system can then utilize code parsing to identify operators 205 of the model. Utilizing a knowledge base 206, the system can tag different portions or concepts of the code at 207. This information can then be used to populate the deep-learning model ontology 212. The identified operators 205 of the model can be combined with the information extracted from the readme files and/or other text 202 to identify data information 208, architecture information 209, layer parameters 210, metric information 211, and the like, which can then be used to populate the deep-learning model ontology 212.

At 104 the system may determine whether a complete ontology for the deep-learning model can be generated. The ontology includes terms and features or attributes of the deep-learning model. Once the information is extracted from the text and/or code, the system can use this information to populate the pre-defined ontology format. The system also utilizes the identified operators to populate the pre-defined ontology format. Once this information has been populated, the system may identify whether any information identified in the format has not been populated. In the event that information is missing, the system attempts to fill-in the missing ontology information at 106.

One technique for filling in the information is to use a bootstrapping method. For example, if information is missing that would normally be identified from the text portion, the system can utilize information from the code portion. In other words, the system can bootstrap the information from the code to fill in the text information. If, on the other hand, information is missing that would normally be identified from the code portion, the system can utilize information from the text portion. In other words, the system can bootstrap the information from the text to fill in the code information. If information is still missing from the ontology, the system can utilize a training and testing technique. For example, the system can evaluate the deep-learning model using one or more sample datasets. In other words, the system can take one or more sample datasets and run the model on the dataset. From these evaluations, the system can fill in missing information. For example, the system can score the robustness of the model by evaluating the model against one or more sample datasets. As another example, the system can identify an effectiveness of the deep-learning model on a particular type of dataset.

If the ontology is complete at 104, or after the missing information has been filled-in at 106, the system can add the deep-learning model and corresponding ontology to the deep-learning model catalog at 105. Thus, by performing the generation of ontologies for a plurality of deep-learning models, the system can generate a model catalog. This model catalog can be indexed for easy searching. Additionally, since the ontologies for each of the models is based upon a pre-defined format, the information available is consistent across all of the models. Therefore, the catalog provides an easy technique for comparing different models.

Such a system and method provide a technical improvement over current techniques for deep-learning model creation. A model developer is able to access a single data storage location that stores deep-learning models and identify different information regarding the stored models. From this information the developer can determine if one or more stored models may fulfill some or all of the requirements of the developer. Thus, rather than a developer having to have expertise in all aspects of the deep-learning model, the developer can focus on the components of the deep-learning model that are unique to the model that the developer is attempting to develop. Additionally, because the deep-learning models are all indexed in one location and each model has an ontology that provides consistent information across all of the models, developers, or other people who may access the catalog, are able to not only search for a particular type of model, but also compare multiple models to determine which one may be best suited for the desired purpose. Thus, the described system and method provide a deep-learning model storage location that provides consistent information across the stored models as opposed to conventional repositories that provide inconsistent information. The system and method also provide a storage location that reduces the amount of time and expertise required for creation of deep-learning models as compared to traditional techniques.

Figure 3:
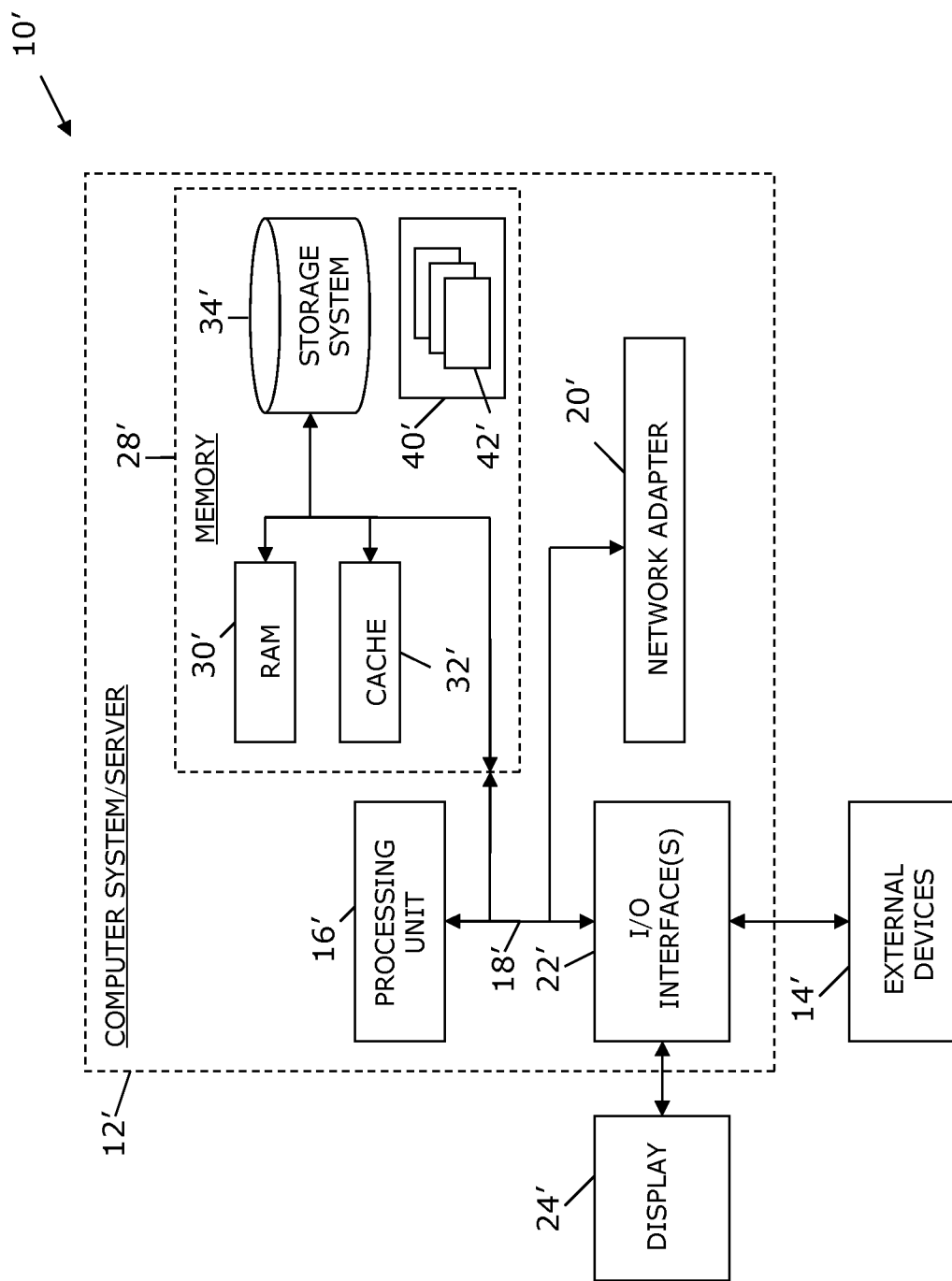
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    mining a plurality of deep-learning models from a plurality of input sources;
    extracting information from each of the deep-learning models, by parsing at least one of (i) code corresponding to the deep-learning model and (ii) text corresponding to the deep-learning model;
    identifying, for each of the deep-learning models, operators that perform operations within the deep-learning model;
    producing, for each of the deep-learning models and from (i) the extracted information and (ii) the identified operators, an ontology comprising terms and features of the deep-learning model, wherein the producing comprises populating a pre-defined ontology format with features of each deep-learning model; and
    generating a deep-learning model catalog comprising the plurality of deep-learning models, wherein the deep-learning model catalog comprises, for each of the deep-learning models, the ontology corresponding to the deep-learning model.

2. The method of claim 1, wherein the extracting comprises defining and utilizing at least one annotator specific to a deep-learning model domain based upon (i) deep-learning model vocabulary and (ii) deep-learning model parsing rules.

3. The method of claim 1, wherein the parsing the code comprises (i) identifying a code framework of the code and (ii) identifying concepts contained within the code using a semantic code parser specific to the identified code framework.

4. The method of claim 3, wherein the parsing the code comprises tagging, using a knowledge base, the code using deep-learning model identifiers by mapping identified concepts to code lines.

5. The method of claim 1, wherein the parsing the text comprises utilizing one or more text parsers unique to a deep-learning model domain.

6. The method of claim 1, wherein the identifying operators comprises identifying sub-tasks of the deep-learning model by mapping a sequence of identified operators to a sub-task.

7. The method of claim 1, wherein the identifying operators comprises generating an abstract syntax tree from the code using an abstract syntax tree builder; and
performing on the abstract syntax tree both (i) a data flow analysis and (ii) a control flow analysis.

8. The method of claim 7, wherein the identifying operators comprises performing (i) a semantic code analysis and (ii) an application programming interface call analysis on information generated from both (i) the data flow analysis and (ii) the control flow analysis.

9. The method of claim 1, wherein the deep-learning model is mined from an input source having no code corresponding to the deep-learning model; and
wherein the extracting information comprises (i) mapping images corresponding to the deep-learning model mined from the input source to code and (ii) utilizing a text annotator specific to a deep-learning model domain to annotate text corresponding to the deep-learning model mined from the input source.

10. The method of claim 1, wherein the producing an ontology comprises evaluating the deep-learning model using at least one dataset to fill-in information missing from the ontology after populating the extracted information and the identified operators in the pre-defined ontology format.

11. An apparatus, comprising:
at least one processor; and
a computer readable storage medium having computer readable program code embodied therewith and executable by the at least one processor, the computer readable program code comprising:
computer readable program code configured to mine a plurality of deep-learning models from a plurality of input sources;
computer readable program code configured to extract information from each of the deep-learning models, by parsing at least one of (i) code corresponding to the deep-learning model and (ii) text corresponding to the deep-learning model;
computer readable program code configured to identify, for each of the deep-learning models, operators that perform operations within the deep-learning model;
computer readable program code configured to produce, for each of the deep-learning models and from (i) the extracted information and (ii) the identified operators, an ontology comprising terms and features of the deep-learning model, wherein the producing comprises populating a pre-defined ontology format with features of each deep-learning model; and
computer readable program code configured to generate a deep-learning model catalog comprising the plurality of deep-learning models, wherein the deep-learning model catalog comprises, for each of the deep-learning models, the ontology corresponding to the deep-learning model.

12. A computer program product, comprising:
a computer readable storage medium having computer readable program code embodied therewith, the computer readable program code executable by a processor and comprising:
computer readable program code configured to mine a plurality of deep-learning models from a plurality of input sources;
computer readable program code configured to extract information from each of the deep-learning models, by parsing at least one of (i) code corresponding to the deep-learning model and (ii) text corresponding to the deep-learning model;
computer readable program code configured to identify, for each of the deep-learning models, operators that perform operations within the deep-learning model;
computer readable program code configured to produce, for each of the deep-learning models and from (i) the extracted information and (ii) the identified operators, an ontology comprising terms and features of the deep-learning model, wherein the producing comprises populating a pre-defined ontology format with features of each deep-learning model; and
computer readable program code configured to generate a deep-learning model catalog comprising the plurality of deep-learning models, wherein the deep-learning model catalog comprises, for each of the deep-learning models, the ontology corresponding to the deep-learning model.

13. The computer program product of claim 12, wherein the extracting comprises defining and utilizing at least one annotator specific to a deep-learning model domain based upon (i) deep-learning model vocabulary and (ii) deep-learning model parsing rules.

14. The computer program product of claim 12, wherein the parsing the code comprises (i) identifying a code framework of the code and (ii) identifying concepts contained within the code using a semantic code parser specific to the identified code framework.

15. The computer program product of claim 12, wherein the parsing the text comprises utilizing one or more text parsers unique to a deep-learning model domain.

16. The computer program product of claim 12, wherein the identifying operators comprises identifying sub-tasks of the deep-learning model by mapping a sequence of identified operators to a sub-task.

17. The computer program product of claim 12, wherein the identifying operators comprises generating an abstract syntax tree from the code using an abstract syntax tree builder; and
performing on the abstract syntax tree both (i) a data flow analysis and (ii) a control flow analysis.

18. The computer program product of claim 12, wherein the deep-learning model is mined from an input source having no code corresponding to the deep-learning model; and wherein the extracting information comprises (i) mapping images corresponding to the deep-learning model mined from the input source to code and (ii) utilizing a text annotator specific to a deep-learning model domain to annotate text corresponding to the deep-learning model mined from the input source.

19. The computer program product of claim 12, wherein the producing an ontology comprises evaluating the deep-learning model using at least one dataset to fill-in information missing from the ontology after populating the extracted information and the identified operators in the pre-defined format.

20. A method, comprising:
    generating a deep-learning model catalog, wherein the deep-learning model catalog comprises (i) a plurality of deep-learning models and (ii) an ontology, in a pre-defined format, for each of the plurality of deep-learning models, wherein the generating comprises:
        obtaining, from at least one input source, a plurality of deep-learning models; and
        creating an ontology for each of the plurality of deep-learning models, wherein the ontology identifies attributes and terms for the deep-learning model, wherein the creating comprises:
            parsing, using a deep-learning model annotator, each of the deep-learning models to extract semantic information for each of the deep-learning models;
            identifying, for each of the deep-learning models, layers of the deep learning model, wherein the identifying comprises (i) identifying granular operations and (ii) grouping the granular operators into a layer that performs a task of the deep-learning model; and
            populating, for each of the deep-learning models, a pre-defined ontology format with (i) the extracted semantic information and (ii) the layers.

* * * * *